United States Patent
Brown

(10) Patent No.: US 7,747,524 B2
(45) Date of Patent: Jun. 29, 2010

(54) METHOD AND SYSTEM FOR DISCOUNT DEBIT CARD

(76) Inventor: Kyle Ray Brown, 3827 Parapet Dr., Cocoa, FL (US) 32926

( * ) Notice: Subject to any disclaimer, the term of this patent is extended or adjusted under 35 U.S.C. 154(b) by 3095 days.

(21) Appl. No.: 10/064,066

(22) Filed: Jun. 6, 2002

(65) Prior Publication Data

US 2003/0229584 A1    Dec. 11, 2003

(51) Int. Cl.
G06Q 40/00 (2006.01)
(52) U.S. Cl. .............................. 705/39; 705/14; 705/41
(58) Field of Classification Search ............. 705/39–41, 705/14
See application file for complete search history.

(56) References Cited

U.S. PATENT DOCUMENTS

| | | | | |
|---|---|---|---|---|
| 5,787,404 A | * | 7/1998 | Fernandez-Holmann | 705/35 |
| 6,014,635 A | * | 1/2000 | Harris et al. | 705/14 |
| 6,105,865 A | * | 8/2000 | Hardesty | 235/380 |
| 6,332,126 B1 | * | 12/2001 | Peirce et al. | 705/14 |
| 6,978,250 B1 | * | 12/2005 | Kawan et al. | 705/14 |
| 7,072,851 B1 | * | 7/2006 | Wilcox et al. | 705/14 |
| 2002/0056746 A1 | * | 5/2002 | Glaser | 235/380 |
| 2002/0138343 A1 | * | 9/2002 | Weatherford et al. | 705/14 |
| 2002/0194069 A1 | * | 12/2002 | Thakur et al. | 705/14 |
| 2003/0105710 A1 | * | 6/2003 | Barbara et al. | 705/39 |
| 2003/0120590 A1 | * | 6/2003 | Ieshima et al. | 705/38 |

OTHER PUBLICATIONS

Melanie Bien, We're plugging into direct debit ; It's a cheap and convenient way of paying bills, but there are pitfalls; The Independent. London (UK): Mar. 10, 2002. p. 10.*
Jeffrey Green; A compromise over debit interchange; Credit Card Management. New York: Apr. 2002. vol. 15, Iss. 1; p. 40, 1 pgs.*
Kelly Shermach; "Loyalty Programs: Inside Charter One's Debit Program ; Fees make credit cards the obvious pick for reward programs. But don't discount debit". Financial Services Marketing. New York: Jan./Feb. 2002. vol. 4, Iss. 1; p. 32.*

* cited by examiner

Primary Examiner—Hani Kazimi
(74) Attorney, Agent, or Firm—Joel I. Rosenblatt

(57) ABSTRACT

A discount debit card is with a merchant's point of sale terminal to register a transaction and send data identifying the transaction, merchant, and the eCard holder to a discount debit plan provider's terminal. Authorization to complete the transaction is sent to the merchant's terminal while the plan provider's terminal manages the cash flow of the merchant discounted transaction amount to the merchant's account, the debit of the eCard holder account for the holder's discounted purchase amount and distribution of the difference between the merchant discounted amount and the eCard holder discounted amount to the plan provider or its affiliates.

27 Claims, 2 Drawing Sheets

METHOD AND SYSTEM FOR DISCOUNT DEBIT CARD

BACKGROUND OF INVENTION

Credit and debit cards as well as systems for using credit and debit eCards are well known to those skilled in the art and are described, for example in U.S. Pat. Nos. 6,327,575 and 6,128,599 and Patent Application 20020042774, published Apr. 11, 2002, and in the references cited therein. By eCard is meant the well known credit or debit card made of plastic or other suitable material containing information about the eCard holder-consumer in a magnetic strip or in an embedded memory chip and authorized by the eCard credit card company such a sponsoring bank, VISA, Master Card or American Express, to transact a sale with a cooperating merchant and have the merchant credited with the sale amount with respect to the customer, like a cash transaction, while the customer has the benefit of a cash less debit or credit transaction.

Among the well known uses of debit and credit eCards are sponsored eCards where a third party sponsors or promotes the eCard to the eCard holder, and the eCard or credit card company issuing the card, such as VISA or Master Card, offers the eCard to the sponsors' members or affiliates, or clients or customers or affiliates of any kind, who represent an exclusive group delivered to the eCard company as eCard users and to the participating merchants as customers. The offer is typically enhanced with a reward such as frequent flyer points or bonus points or rebates directly in money or other credits for use in transactions made later in time with the sponsor's card. In this way, the consumer can build credits with each purchase for later use but receives no immediate discount benefit.

While the systems and methods shown in the above stated references have achieved success for eCard credit or debit card companies, directly as credit cards or debit cards, or as credit or debit cards with enhanced services, a disadvantage is suffered because these aforementioned method and systems are not shown as disclosing a straight debit card which provides a direct and immediate discount to the eCard using consumer, while strengthening the bond between the sponsor and the consumer by connecting the consumer to merchants offering direct discounts to the consumer through, and because of the sponsor. and do not permit a full direct discounted payment to the merchant.

Other disadvantages of prior systems was inefficiency or lack or a system and method of identifying a customer's preference when receiving a discount, and by first requiring the customer first accumulate some type of cash value, rebates, points, prizes, gift certificates or similar reward.

The prior systems requiring the recording of accumulated credits throughout the customer's transaction history had the additional software or hardware computer and data transmission equipment costs to maintain the vital customer records and the capability of authenticating those records. The prior systems lacked an efficient system and method for electronically adding a merchant as a member merchant in the sponsored discount system and immediately upon adding the merchant, enabling the merchant to enter into discount transactions with a customer presenting an authentic sponsor debit card.

The prior systems and methods lacked the capability of operating over an open network, for example the Internet, to prepare and send a data to the merchant from a central location to enroll the merchant in the sponsors discount debit plan, or to use an eCard meaning a card with data in electronic form to enroll the merchant by processing the card as a debit or credit transaction at the merchant's point of sale terminal, whereby the merchant's account may be debited directly for the merchant's discount, the customer's account may be debited directly, the eCard sponsor's credit may be distributed.

SUMMARY OF INVENTION

Credit and debit cards as well as systems for using credit and debit eCards are well known to those skilled in the art and are described, for example in U.S. Pat. Nos. 6,332,134, and 6,014,635 and Patent Application 20020042774, published Apr. 11, 2002, and in the references cited therein, all of which are incorporated herein by reference.

The prior systems and methods lacked the capability the invention and the inventive principles disclose herein of completing a customer discount debit transaction with an eCard, after the customer's eCard used in a transaction is authenticated by the eCard company and with the eCard company removed from any of the cash flows in the transaction by the discount debit eCard service provider system or of the use of a fungible cash source or reservoir to pay the merchant, rather then by paying the merchant directly from the consumer's account.

As is well known to those skilled in the art of electronic commerce, as shown and disclosed in the above stated patents, one example of many standard computer data processing telecommunications networks for transmitting authorization requests is the VISA® credit transaction network. In addition to VISA® credit cards, merchants connected to this network may seek authorization for approval of transactions involving other credit cards, such as MASTER CARD® and DISCOVER® credit or debits cards. The VISA® credit transaction network includes a plurality of data processors and financial institutions, all interconnected through telecommunication links which, based on a six digit bank identification number (BIN), route all authorization requests to the appropriate card-issuer and all authorization responses back to the requesting merchant.

The eCard issued to the eCard user contains information about the eCard holder in electronic form, as is well known to those skilled in the art and which is used to complete the eCard transaction as is explained herein in a preferred embodiment of the invention.

For the purpose of explanation, the invention method and system identified herein in a preferred embodiment, is described as the Success™ plan and the Success debit discount plan, and for the purpose of explanation of a preferred embodiment, the disclosed inventive principles are explained in relation to four parties. However, as would be understood by those skilled in the art, the principles of the disclosed invention as shown in a preferred embodiment herein are not limited to the name "Success" given to the disclosed system or method or any of its features or method or to the particular examples or the parties used to explain the disclosed invention.

In a disclosed preferred embodiment, the Success plan eCard holder, as explained herein is the consumer using the Success debit discount eCard as a debit card instead of cash, when making a purchase transaction with a Success plan participating merchant. The eCard credit or debit card company, such as VISA, or Master Card or American Express, or a bank for example, may serve to initiate the settlement process by initially authorizing or guarantying the Success debit discount eCard purchase transaction or transaction amount to the merchant. The Success plan participating merchant which makes a sale or completes a transaction with the Success discount debit eCard holder, using the Success or affiliated eCard, does so according to a Success discount debit plan wherein a discount of the sale transaction amount is given to the Success discount debit eCard holder, as arranged with a Success discount debit plan provider affiliate who may be a marketing agent or other business entity marketing the Success plan, for example as an affinity eCard, and who may have identified or be identified on the Success debit discount eCard, for example with the Success plan provider's trademark or service mark such as Success™ shown as an example.

As explained with reference to the disclosed invention and a disclosed preferred embodiment, the Success plan provider system, in accordance with the Success plan, arranges for the payment of the full or discounted transaction amount to the participating merchant, and where the full transaction amount is paid by the Success plan provider to the participating merchant, by promptly debiting the merchant's account for the amount of the merchant discount so the transaction amount available to the merchant is the merchant discounted amount of the transaction. The Success plan provider system arranges for the transaction related discounted debit to the eCard holder's account and the distribution of the Success fees, according to the Success provider's plan, from the difference between the amount taken from the merchant as a merchant discount and the discount given to the eCard holder, to the Success plan affiliates, for example the Success plan sponsor or eCard company or any other affiliates. As stated above, these Success fees may be paid by the Success plan provider's system, for example, to a Success plan sponsor on a Success debit discount eCard transaction with the sponsor's clients, members, customers, or any others who obtain the Success debit discount eCard through the sponsor, according to the Success plan captured in the plan provider system's connected data base.

For explanation, the inventive method and system is described with reference to Success discount debit eCard and the eCard holder, the sponsor, the eCard company and the Success plan provider, it being understood by those skilled in the art, that the respective parties functions and places in the disclosed inventive Success plan and its process, could be incorporated in, combined in, or exchanged with the other parties described above.

According to the principles of the disclosed invention, the Success discount debit eCard may be suitably marked with the identity of the sponsor or the Success plan provider or the eCard company or any combination thereof.

In a preferred embodiment, the participating merchant enrollment process is a data entry process whereby data indicative of the merchant or merchant identifying data, is transmitted with transaction data for a sample transaction, from the merchant's point of sale terminal to the Success plan provider's system. The merchant's identifying data is entered into the Success plan provider's system and the participating merchant can then be registered in the plan provider's system. The plan provider's system then can respond to transaction data generated by the use of the card holder's eCard, for example in a participating merchant sales transaction, for crediting of the merchant's account with the transaction amount reduced by the merchant's discount and debiting of the card holder's account with the transaction amount reduced by the eCard holder discount and distributing at least part of the difference between the card holder discount and the merchant discount to the discount plan provider or its affiliates.

The Success plan inventive method and system, as disclosed in a preferred embodiment herein, is used to directly retrieve or access the participating merchant's transaction related merchant identifying data, at the time of the transaction, without requiring any additional hardware or software on the merchant's part or the eCard company's part. Upon receiving the relevant transaction and merchant and eCard identifying data from the merchant's point of sale terminal, the Success plan system can directly credit the merchant for the full amount of the transaction and promptly debit the merchant's account for the merchant discount or credit the discounted amount to the merchant's account after deducting the merchant's discount from the full amount of the transaction and debit the eCard holder's account for the eCard holder's discounted transaction amount, which is debited to the Success plan provider's account, or any other account which may be suitably designated.

According to the disclosed inventive principles, the credit to the merchant's account, with respect to any one identifiable transaction is the merchant discounted amount or the transaction amount reduced by the merchant discount.

The Success plan system can be used to determine the proper customer discount and debit the customer account, while retaining or distributing the difference between the discount taken from the merchant and given to the eCard holder as a Success fee to the participating marketing partners, or affiliates such as the eCard company and the sponsor, for example.

When a Success discount debit card is used, the transaction related information related to the Success discount debit eCard plan, such as for example, the sale amount, the Success plan discount debited to the participating merchant, the purchase discount given to the eCard holder and the Success fees for distribution to the sponsor and the eCard company and Success Plan provider or to any other marketing partner or affiliates, may be accessed and used by the Success plan provider system in the process of distributing the cash flows from the transaction. As all of the information may be captured by the Success plan system, all related accounts may be credited or debited according to the transaction data sent from the participating merchant; point of sale terminal and responsive to the Success plan data in the Success plan provider's data processing system.

Other objects of the disclosed invention are an electronic transaction eCard that gives consumers a discount at participating merchants, which can be operated through an open network, such as the Internet for example, or a private or semi-public network and which can be used with multiple participating merchants, which has all the functions of a nationally accepted offline debit card and a pin based online debit card, and which can access all of the related transaction related information at the point of sale, to properly disburse funds according the to established discounts, and percentage allocation of fees for all of the Success plan participants are disclosed in the following description of a preferred embodiment.

What is shown and described in a preferred embodiment, according to the disclosed inventive principles is the following.

A system for operating a discount debit card plan for processing of an eCard holder transaction by using a discount plan provider system responsive to a merchant's eCard holder related transaction data, crediting the merchant with the transaction amount reduced by a merchant discount and debiting the eCard holder with the transaction amount reduced by an eCard holder discount, and crediting the difference between the merchant discount and the card holder discount as at least one fee to the discount debit card plan provider or its affiliates, comprising, a discount debit plan provider terminal containing data indicative of a discount debit card plan for use by participating merchants and for application to transactions with a discount debit plan provider's authorized eCard; a participating merchant terminal with merchant identifying data; said discount debit plan provider eCard with eCard data, including eCard holder identifying data; a telecommunications network connecting said discount debit plan provider terminal and said merchant terminal for transmitting data between said terminals; said merchant terminal responsive to said eCard data and to transaction data related to a transaction made between said participating merchant and said eCard holder for transmitting said transaction data to said discount debit plan provider's terminal; said discount debit plan provider's terminal responsive to said transaction data for crediting said merchant's account with a merchant's discounted amount represented by said full transaction amount reduced by said participating merchant discount and debiting said eCard holder's account with a eCard holder discounted amount represented by said transaction amount reduced by said eCard holder's discount; and wherein said discount debit plan provider's terminal credits a difference between said participating merchants discounted amount and said eCard holder's discounted amount as at least one fee to said discount debit plan provider or its affiliates.

A method of operating a discount debit card plan for processing of an eCard holder transaction by using a discount plan provider system responsive to a merchant's eCard holder related transaction data, crediting the merchant with the transaction amount reduced by a merchant discount and debiting the card holder with the transaction amount reduced by an eCard holder discount, and crediting the difference between the merchant discount and the card holder discount as at least one fee to the discount debit card plan provider or its affiliates, comprising the steps of, connecting into a telecommunications network a discount debit plan provider terminal containing data indicative of a discount debit card plan for use by participating merchants and for application to transactions with a discount debit plan provider's authorized eCard; connecting into said telecommunications network, a merchant terminal with merchant identifying data; including in said eCard, eCard data eCard holder's identifying data; transmitting said transaction data to said discount debit plan provider's terminal from said merchant terminal, responsive to said eCard data and to transaction data related to a transaction made between said participating merchant and said eCard holder; responsive to said transaction data, crediting said merchant's account with a merchant's discounted amount represented by said full transaction amount reduced by said participating merchants discount and debiting said eCard holder's account with a eCard holder's discounted amount represented by said transaction amount reduced by said eCard holder's discount; crediting a difference between said participating merchant's discount and said eCard holders discounted amount as at least one fee to said discount debit plan provider or its affiliates.

DETAILED DESCRIPTION

The invention, as shown and described in a preferred embodiment may be practiced over any data processing or telecommunications system, whether using existing electronic or optical technology or any other technology conceived or invented hereafter for transforming or transducing information in human perceptible form into a form for transmission to a remote location at any distance and for transformation into human perceptible form. and whether open as is the Internet for example or a closed system such as an ethernet system or a public system such as a regulated or unregulated telephone based system. The method and systems for collecting, accessing, processing, transporting, and resolving credit and debit card transaction related information, are well known to those skilled in the art, as disclosed in the patents and application incorporated by reference herein and are not disclosed in detail as well known to those skilled in the art and understood as an incorporated part of this application.

Figure 1:
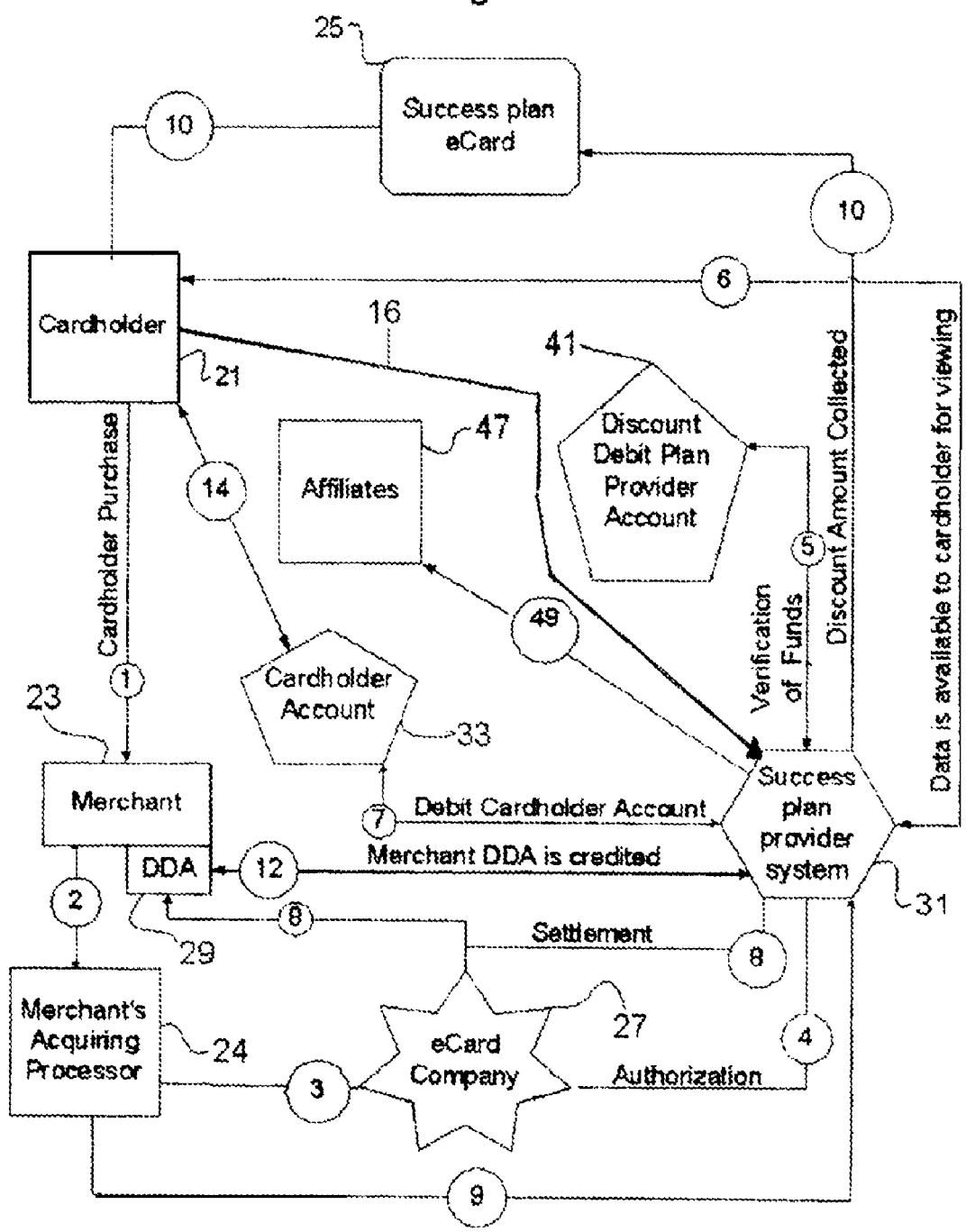
FIG. 1 shows the system as used in operation of the Success discount debit eCard plan.

The method and system as shown in the FIG. 1, may start with a customer who is a Success plan eCard holder 21 using the Success discount debit eCard 25, to make a purchase at a participating merchant 23, as shown by path 1. Success discount debit eCard, 25, as shown in a preferred embodiment, may be any electronic or smart card as would be known to those skilled in the art, containing all of the eCard holder customer related information, for example, the sponsor, the customer directly related account and authentication information, any Sponsor related eCard discount information, or any other information needed at the participating merchant's point of sale terminal shown in FIG. 1, as merchant's Acquiring Processor 24.

The Success discount debit card 25 as shown in a preferred embodiment, may be provided by the Success plan provider system 31, to the Success plan eCard holder 21, as shown by path 10, and as would be well known to those skilled in the art.

The participating merchant's point of sale terminal 24 may be preset with the Success plan information relevant to a Success discount debit eCard 25 authorized transaction, such as the merchant account and identifying data, and authentication data or information and any other data or information needed or desirable for the Success plan provider system 31, to allocate and direct the transaction responsive cash flow to the participating merchant 23 as payment for the transaction, and to the merchant's direct deposit account (DDA) 29, depending on whether the inventive system and method is used to transfer the merchant discounted amount to the merchant's DDA 29, or the full amount of the transaction to the merchant's DDA 29, and then promptly debit the account 29 for the amount of the plan discount, so the merchant's credit, and the funds available to the merchant, at the time of the transaction is limited to the merchant discounted transaction amount, according to the terms of the Success plan and as contained in the Success plan provider system 31.

Figure 2:
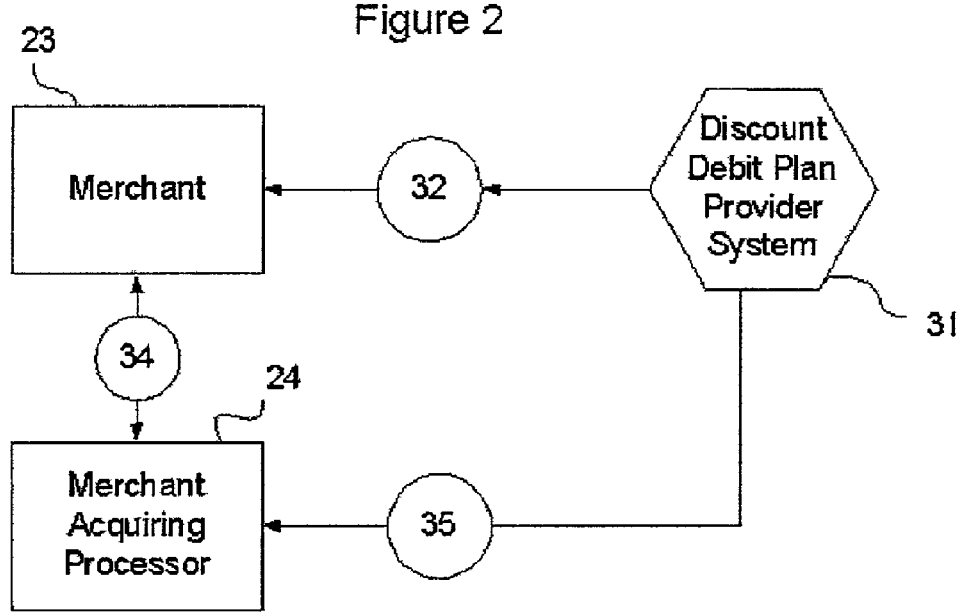
FIG. 2 shows the system for enrolling a participating merchant in the Success plan.

The method and system for providing the relevant Success plan data to the Merchant at the point of sale terminal 24 or for enabling the merchant's point of sale terminal 24 for a Success plan discount debit card transaction, is explained in connection with FIG. 2. For example, as disclosed for a preferred embodiment, the merchant may provide the Success plan provider basic identifying information, as for example, the merchant's name, address, phone, contact person, checking account information, with routing numbers and account numbers, which is entered into the Success plan provider's system 31 by means of an electronic or manual process, by path 32. The Success plan provider system 31 may then issue a sample credit card with a credit card number for reference which is given to the merchant, directly or by data transmission over path 32. This sample credit card is provide with a nominal transaction dollar amount and an expiration date nominally suitable for this sample transaction intended for registering the merchant or the merchant's point of sale terminal 24 in the data base used by the plan provider system 31. The sample credit card data, entered in path 34, as a transaction into the merchant's point of sale terminal 24, is transmitted to a system data processor, for example, the data processing system shown as the Success plan provider system 31, over path 35. The plan provider system 31 is arranged to accept the transaction data but deny the transaction so the system captures the merchant relevant information, from the merchant's point of sale terminal 24, for example, the terminal 24 identification, and other merchant identifying data, as known to those skilled in the art. This identification data may then be used to register the merchant by adding this information or matching this data to matching data in the Success plan provider system 31 and the sample credit card is canceled by its expiration at the plan system 31.

In operation of the Success discount debit eCard system, as shown in FIG. 1, the Success plan's eCard company 27, may serve to initiate the settlement process by initially authorizing or guarantying the Success debit discount eCard purchase transaction or transaction amount to the participating merchant. The Success plan provider system 31 as shown in FIG. 1, may be connected directly to the Success plan eCard company 27 by path 4, for receiving and completing the settlement of the transaction with the participating merchant 23, by the plan provider system 31. The settlement as shown in FIG. 1 is by path 8, directly into the merchant's direct deposit account (DDA) 29.

In receiving data indicative of the transaction, from merchant's point of sale Acquiring Processor 24, through the eCard company 27 over path 4 or directly over path 9, the Success plan provider's system 31, using the related plan information from its connected data base, starts the process of settling all accounts according to the Success fees and discounts as may be prearranged and captured in the Success plan provider system 31 data, with the participating merchants, with the Success plan eCard company, and all of the other affiliate in the Success plan.

As shown in FIG. 1, the Success plan provider system 31, using the transaction data received from the participating merchant's processor 24, through or in connection with the Success plan eCard company 27, by path 4 or directly from the merchant's Acquiring Processor 25, by path 9, may authorize and make payment directly from the Success plan provider system 31, to the merchants DDA 29 as shown by pathway 3, 4, and 8 or 9 and 12, respectively and then debit the Success plan eCard holder-customer 21 account 33 for the amount of the card Holder discounted transaction, as shown by path 7.

As would be understood by those skilled in the art, the data or information relevant to the transaction made by the Success plan eCard holder 21 using the Success plan eCard 25 at a participating merchant 23, and produced in response to the transaction and to the merchant's point of sale terminal 24, may be transferred directly to the Success plan provider system 31 for disbursements of all transaction cash flows according to the Success plan arranged payments of credits and allocation of debits and of the Success fees to the Success plan affiliates.

Figure 3:
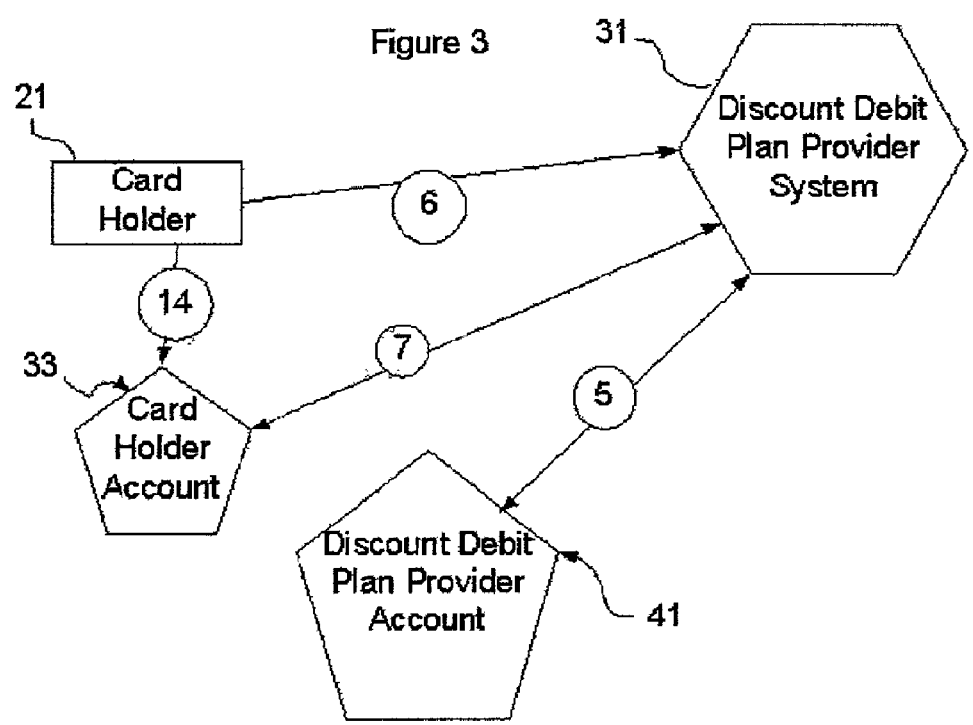
FIG. 3 shows the system for distributing the cash flows from the Success plan eCard transaction and for distributing the Success fees.

Referring to FIG. 1 and FIG. 3, the inventive method and system as shown in a preferred embodiment, is disclosed with regard to the payment of the participating merchant 23 directly by the Success plan provider system 31 from a Success plan provider 31 source account 41, through path 5, and which may contain a pooled or fungible source of funds which can be applied to the settlement of any transaction made by any of the Success plan eCard holders without identification of, or irrespective of, the specific eCard Holder supplying the funds into the source account and used for any one respective transaction. The source account may be established from non-refundable enrollment fees or funds held in escrow, or any other source of funds which may be pooled or used as a fungible source of funds for settling any eCard holder's transactions.

The method and system for enrolling the Success plan eCard holders is shown in a preferred embodiment in FIG. 1. The Success plan eCard holder, 21, as part of the enrollment process in the Success plan, as shown as an example, transmits or otherwise authorizes payment over path 16 to the Success plan provider system 31, of a non-refundable enrollment fee or amount for any other purpose which may be non-refundable or held in escrow as guarantee for payment under an escrow agreement. The Success plan provider system 31, responsive to this payment authorization from the Success plan eCard holder 21 then may debit the eCard holder's account 33 over path 7 and credit this amount in the Success plan provider's source account 41 over path 5. The Success plan provider system 31 may verify the amount of funds in the source account 41 of the Success plan provider's fungible funds through path 5, or by any other path, as would be known to one skilled in the art. The eCard holder may similarly verify the deposit of its fees or deposits into the source account 41 over path 6, or authorize the transaction through its account 33 by path 14, as would be known to those skilled in the art.

The funds in the source account 41 may be accessed by the Success plan provider system 31, in direct settlement of any transaction between the Success plan eCard holder 21 and a participating merchant 23. The funds in account are fungible or pooled and the separate payments made from this account are irrespective of the identity of any card holder funds in account 41.

The inventive method and system may be understood from its operation, as described with reference to FIGS. 1, 2 and 3. In describing the aforesaid operation as would be understood the debits, discounts and fees, states as respective percentages of the transaction amount, are for the purpose of explanation only and are not liming of the invention, these debits, and discounts being modifiable in accordance with the market needs.

Where, for example, a transaction is made with a Success plan eCard holder 21 and a participating merchant 23 through the merchant's point of sale terminal 25, the relevant transaction data, for example, the merchants identifying data, the eCard identifying data and the nature of amount of the transaction, is transmitted to the Success plan provider's terminal over pathway 3, 4, or directly to the Success plan provider system 31 by path 9. Responsive to the transaction data from the merchant's point of sale terminal 24, by path 4 or 9, respectively the Success plan provider system 31, may remit 100% of the transaction by path 8 to the merchant and then the Success plan provider 31, promptly may debit the merchant's DDA 29 over path 8 or 12, for the merchant discount, for this example as shown in a preferred embodiment, 10% of the transaction, so only the merchant discounted transaction amount is available to the merchant, or the Success plan provider system 31 may remit the discounted transaction amount to the merchant's account 29, by reducing the full transaction amount by the merchant's discount, in this example shown as 90% of the full transaction.

Settlement with the eCard user 21, as explained above may be by the Success plan provider terminal 31, debiting the eCard holder's account 33 for the discounted transaction amount, as shown in this example for a 5% discount, by debiting the eCard holder's account for 95% of the transaction amount. As would be known to those skilled in the art, the discount amounts and the time sequence of authorizing the crediting or debiting the accounts responsive to the transaction or the time sequence for applying the discounts or for allocating the Success fees, as explained below, may be varied without departing from the principles of the disclosed invention.

The Success plan fees due to the Success plan affiliates 43, for their participation in the Success plan, which may be, for example, the eCard company 27 and the Success plan sponsors, may be paid according to the agreement with the Success plan provider and as captured in the Success plan provider's system 31 data base, from the difference between the transaction discount taken from the merchant 23 and the discount given to the eCard user 21. As part of the 10% discount taken from the merchant 23, in the example shown above, for example 5% is given as a discount to the eCard holder. The Success fees paid to the Success plan affiliates for example, may be taken from the difference between the merchant's discount and the eCard holder's discount or 10%-5%=5% in the example shown. For example the Success plan provider system 31 may allocate to the eCard company 27, 1%, the sponsor 2% and the Success plan provider 31 the remaining 3% of the 5% discount difference. As would be understood by those skilled in the art, these discounts are by way of example only and are no limiting of the disclosed inventive principles.

The Success plan provider may then pay these aforesaid amounts or Success fees by withdrawing it from its source account 41 representing a reservoir or pooled account of fungible funds, through path 5 by the Success plan provider system 31 and replenish this source account by debiting the Success plan eCard holder's account 33 for the transaction amount less the amount of the discount given under the Success plan to the Success plan eCard holder and replenishing or crediting the Success plan provider's source account 41 with the eCard Holder's discount debited amount. As would be understood to those skilled in the art, the discount given to the Success plan eCard holder 21 would be less than the discount debited to the merchant 23 so an excess or remainder may be for allocating Success Fees. The Success fees coming from the remainder of the larger discount taken from the merchant 23 and the smaller discount given to the Success plan eCard holder may be reallocated to the Success plan provider source account 41 and distributed as respective Success Fees to the Success plan sponsor or other marketing partners or affiliates 47 over path 49, as shown in FIG. 1.

For this example disclosed in relation to a preferred embodiment, the 10% transaction debit taken from the merchant 23, may be allocated as a 5% transaction discount to the Success plan eCard holder, a 1% Success Fee to the Success plan eCard company, and a 2% Success Fee split to the Success plan eCard sponsor 47 with 2% of each transaction allocated to the Success plan provider 31 and credited to each of the parties as described above by the Success plan provider's system 31.

When the consumer receives the card, the cardholder and before use, the eCard holder may be required to activate the card through an automated procedure for security purposes. The card may be activated with a predetermined open to buy limit that may be changed at any time based on credit history, customer retention, customer spending habits and other vital information. Each time there is an approved transaction the Success plan system data base for the eCard holder's open to buy is lowered by the approval amount. The eCard holder's account is then debited for the approval amount minus the advertised cardholder discount amount. After a positive response from the registered account of the cardholder the open to buy is increased to the appropriate amount.

These and other features of the invention as shown in a preferred embodiment and in the best mode for using the invention, are disclosed so one skilled in the art would know how to make and use the claimed invention from the description herein, including without limitation, the drawings.

The invention claimed is:

1. A system for operating a discount debit card plan for processing of an eCard holder transaction by using a discount plan provider system responsive to a merchant's eCard holder related transaction data, crediting the merchant with the transaction amount reduced by a merchant discount and debiting the eCard holder with the transaction amount reduced by an eCard holder discount, and crediting the difference between the merchant discount and the card holder discount as at least one fee to the discount debit card plan provider or its affiliates, comprising, a discount debit plan provider terminal containing data indicative of a discount debit card plan for use by participating merchants and for application to transactions with a discount debit plan provider's authorized eCard; a participating merchant terminal with merchant identifying data; said discount debit plan provider eCard with eCard data, including eCard holder identifying data; a telecommunications network connecting said discount debit plan provider terminal and said merchant terminal for transmitting data between said terminals; said merchant terminal responsive to said eCard data and to transaction data related to a transaction made between said participating merchant and said eCard holder for transmitting said transaction data to said discount debit plan provider's terminal; said discount debit plan provider's terminal responsive to said transaction data for crediting said merchant's account with a merchant's discounted amount represented by said full transaction amount reduced by said participating merchant's discount and debiting said eCard holder's account with a eCard holder's discounted amount represented by said transaction amount reduced by said eCard holder's discount.

2. The system of claim 1, and wherein said discount debit plan provider's terminal credits a difference between said participating merchants discounted amount and said eCard holder's discounted amount as at least one fee to said discount debit plan provider or its affiliates.

3. The system of claim 1, wherein, said discount debit plan provider's terminal is responsive to said transaction data for crediting said merchant and for debiting a source account of fungible funds for the amount credited to said merchant and for replenishing said source account from at least a part of said amount debited to said eCard holder's account.

4. The system of claim 3, wherein said debiting of said source account is made without identification of a respective eCard holders funds placed in said source account.

5. The system of claim 1, including an eCard containing data related to said discount debit card plan; said merchant terminal responsive to said eCard, for transmitting to said discount debit plan provider's terminal, merchant identifying data for entry into said discount debit plan provider's terminal.

6. The system of claim 5, wherein said eCard includes sample transaction data and said discount debit plan provider's terminal, responsive to transaction data indicative of said sample transaction, denies the participating merchant credit for said sample transaction.

7. The system of claim 5, wherein, said discount debit plan provider's terminal, responsive to said merchant identifying data, registers said merchant as said participating merchant in said discount debit card plan.

8. The system of claim 1, wherein said telecommunications network connects said discount debit plan provider's terminal to said participating merchant through an eCard company terminal; said eCard company terminal responsive to said transaction data, transmits said transaction data to said discount debit plan provider's terminal.

9. The system of claim 8, wherein said eCard company terminal responsive to said transaction data from said participating merchant's terminal, transmits data authorizing said transaction to said participating merchant's terminal.

10. A method of operating a discount debit card plan for processing of an eCard holder transaction by using a discount plan provider system responsive to a merchant's eCard holder related transaction data, crediting the merchant with the transaction amount reduced by a merchant discount and debiting the card holder with the transaction amount reduced by an eCard holder discount, and crediting the difference between the merchant discount and the card holder discount as at least one fee to the discount debit card plan provider or its affiliates, comprising the steps of, connecting into a telecommunications network a discount debit plan provider terminal containing data indicative of a discount debit card plan for use by participating merchants and for application to transactions with a discount debit plan provider's authorized eCard; connecting into said telecommunications network, a merchant terminal with merchant identifying data; including in said eCard, eCard data eCard holder's identifying data; transmitting said transaction data to said discount debit plan provider's terminal from said merchant terminal, responsive to said eCard data and to transaction data related to a transaction made between said participating merchant and said eCard holder; responsive to said transaction data, crediting said merchant's account with a merchant's discounted amount represented by said full transaction amount reduced by said participating merchant's discount and debiting said eCard holder's account with a eCard holder's discounted amount represented by said transaction amount reduced by said eCard holder's discount.

11. The method of claim 10, including the steps of, crediting a difference between said participating merchant's discount and said eCard holder's discounted amount as at least one fee to said discount debit plan provider or its affiliates.

12. The method of claim 10, including the steps of, responsive to said transaction data, crediting said merchant and debiting a source account of fungible funds for the amount credited to said merchant and replenishing said source account from at least a part of said amount debited to said eCard holder's account.

13. The method of claim 12, wherein said step of debiting of said source account is made without identification of a respective eCard holders funds placed in said source account.

14. The method of claim 10, including the step of including within an eCard, data related to said discount debit card plan; and transmitting to said discount debit plan provider's terminal, merchant identifying data for entry into said discount debit plan provider's terminal.

15. The system of claim 14, including the steps of including within said eCard, sample transaction data; transmitting from said merchant's terminal, data indicative of said sample transaction, receiving at said discount debit plan provider's terminal said data indicative of said sample transaction; and responsive to said data indicative of said sample transaction, denying said the participating merchant credit for said sample transaction.

16. The method of claim 14, including the step of registering said merchant as a participating merchant in said discount debit card plan, responsive to said merchant identifying data.

17. The method of claim 10, including the steps of connecting said discount debit plan provider's terminal to said participating merchant through an eCard company terminal; and transmitting said transaction data to said discount debit plan provider's terminal from said eCard company terminal.

18. The method of claim 17, including the steps of transmitting data authorizing said transaction to said participating merchant's terminal, responsive to said transaction data from said participating merchant's terminal.

19. A system for operating a discount debit card plan for processing of an eCard holder transaction by using a discount plan provider system responsive to a eCard holder related transaction data, crediting a merchant with the transaction amount reduced by a merchant discount and debiting the card holder with the transaction amount reduced by an eCard holder discount, and crediting the difference between the merchant discount and the card holder discount as at least one fee to the discount debit card plan provider or its affiliates, comprising, means for storing and for processing data indicative of a discount debit card plan;

means for storing eCard holder identifying data;

means for the transmission and reception of data;

means for storing participating merchant identifying data and for processing transaction data indicative of a transaction with said means for storing eCard holder identifying data;

said means for storing and processing data indicative of a discount debit card plan, for processing said transaction data for said transaction with said eCard holder and said participating merchant, including a transaction amount, said participating merchant identifying data, and said eCard holder data;

said means for the transmission and reception of data for connecting said means for storing and for processing data indicative of a discount debit card plan and said means for storing participating merchant identifying data, for transmission of said transaction data to said means for storing data and for processing data, indicative of a discount debit card plan;

said means for storing and for processing data indicative of a discount debit card plan for crediting a participating merchant's account with a participating merchant's discounted amount represented by said transaction amount reduced by a participating merchant discount, and for debiting said eCard holder's account with an eCard holder's discounted amount represented by said transaction amount reduced by an eCard holder discount.

20. The system of claim 19, wherein said means for storing and for processing data indicative of a discount debit card plan includes means for crediting a difference between said participating merchant's discounted amount and said eCard holder's discounted amount.

21. The system of claim 20, wherein, said means for storing and for processing data indicative of a discount debit card plan includes means for crediting said participating merchant account from a source of fungible funds.

22. The system of claim 19, including means for storing sample transaction eCard holder identifying data, said means for storing and for processing data indicative of a discount debit card plan, for processing sample transaction data for a sample transaction with said sample eCard holder and said participating merchant.

23. The system of claim 22, wherein said means for storing and for processing data indicative of a discount debit card plan, includes means to deny the said participating merchant, credit for said sample transaction.

24. The system of claim 23, wherein, said means for storing and processing data indicative of a discount debit card plan, includes means for processing said sample transaction data for registering said merchant as a participating merchant in said discount debit card plan.

25. The system of claim 21, including means for replenishing said source of fungible funds from at least a part of said eCard holder's discounted amount.

26. The system of claim 25, wherein said means means for replenishing said source of fungible funds, includes means for debiting said eCard holder account.

27. The system of claim 20, wherein said means for storing and for processing data indicative of a discount debit card plan, includes means for debiting said eCard holder account.

\* \* \* \* \*